United States Patent [19]

Sibeud et al.

[11] Patent Number: 4,846,050
[45] Date of Patent: Jul. 11, 1989

[54] SYNCHRONIZED CONTROL OF GEARBOX BY AN ELECTRONIC CALCULATOR

[75] Inventors: Jean P. Sibeud, Chaponnay; Gérard Ellenberger, Hameau des Charpes St Sorlin, both of France

[73] Assignee: Renault Vehicules Industriels, France

[21] Appl. No.: 86,205

[22] Filed: Aug. 17, 1987

Related U.S. Application Data

[63] Continuation of Ser. No. 733,950, May 14, 1985, abandoned.

[30] Foreign Application Priority Data

May 14, 1984 [FR] France ............................. 84 07829

[51] Int. Cl.⁴ ............................................. F01B 7/04
[52] U.S. Cl. ............................................. 92/68; 92/73; 92/147; 74/335
[58] Field of Search ............... 92/68, 73, 147, 150, 92/151, 13.6, 13.3, 138; 74/335, 337.5, 473 R

[56] References Cited

U.S. PATENT DOCUMENTS

| | | | |
|---|---|---|---|
| 1,580,249 | 4/1926 | Hornor | 92/68 |
| 2,619,943 | 12/1952 | Monleone | 92/68 |
| 2,815,901 | 12/1957 | Hale | 92/68 |
| 3,148,595 | 9/1964 | Looney | 92/68 |
| 3,150,489 | 9/1964 | Dewar | 92/68 |
| 3,253,518 | 5/1966 | Duemler | 92/68 |
| 3,447,423 | 6/1969 | Henry | 92/68 |
| 4,392,631 | 7/1983 | De Wald | 92/138 |

FOREIGN PATENT DOCUMENTS 0065449 4/1982 Japan ............................... 74/337.5

Primary Examiner—Robert E. Garrett
Assistant Examiner—T. Denion
Attorney, Agent, or Firm—Remy J. VanOphem

[57] ABSTRACT

A device designed to actuate the positive clutches of gearbox sliding gears following synchronization of the respective pairs of gears. A cylinder mechanism is provided on each sliding plate of the gearbox, as well as solenoid valves which are controlled by an electronic calculator to select and actuate the cylinders. Each cylinder mechanism includes two oppositely acting pistons, each connected to the sliding plate, and each sliding in its own cylinder which also includes a return spring which operates against each piston and which practically eliminates the clearance above the piston as the piston is about to be actuated.

13 Claims, 2 Drawing Sheets

SYNCHRONIZED CONTROL OF GEARBOX BY AN ELECTRONIC CALCULATOR

This is a continuation of application Ser. No. 733,950, filed May 14, 1985, now abandoned.

BACKGROUND OF THE INVENTION

1. Field of the Invention

This invention relates to a device for controlling the travel of a gearbox selector fork and for activating the positive clutch of a sliding gear when synchronized with the selected gear ratio.

This device may be used to electronically control the synchronization of the shifting of the gearbox to shift gears "on-the-fly" without any synchronizing ring.

2. Description of the Prior Art

Traditionally, the synchronization of the rotational speed of two gears before they mesh is provided by mechanical friction members known as synchronizers. Generally, the mechanical synchronizers, which include friction rings, have a number of disadvantages, particularly in terms of efficiency and size. Furthermore, they significantly increase the mechanical complexity of the gearbox construction.

The present invention eliminates the above disadvantages by offering a device which synchronizes the pairs of gears, upon shifting thereof, using fully electronic means.

French Pat. No. 2,417,689 and its first continuation No. 2,431,642 disclose a mechanism consisting of a quick clutch release to effect the disengagement of the gear followed by a new clutching after the neutral position has been obtained. Thereafter, the engine speed and, therefore, that of the clutched gear, is monitored to bring the gear to the desired synchronization speed. Once this result is obtained, both transmission shafts of the gearbox are positively clutched.

In fact, considering both the timing and the swiftness of the operation, it appears that the accuracy of the gearshift operation depends on three main parameters.

The first parameter, $\alpha$, is the ratio between the gearbox input angular speed and the gearbox output angular speed.

The second parameter, $\mu$, is the $\alpha$ variation speed during the synchronization phase, namely the speed of convergence toward synchronization during the synchronization phase.

The third parameter, T, is the time required for the actuator to engage the positive clutch after receiving the order.

Considering the above, if $\alpha_c$ is the value of ratio $\alpha$ to which the positive clutching order is given so as to perform the operation, and $\alpha_m$ is the gear ratio to be clutched, the following observations can be made. $\alpha$ is known, but not accurately; $\mu$ cannot be exactly calculated and varies throughout the synchronization phase; and T does not remain constant from one operation to another.

In conclusion, the error that can be made depends on the three values $\alpha$, $\mu$, and T. It appears that the positive clutching accuracy upon synchronization could be improved by reducing T.

In particular, if the duration T became shorter than the calculation intervals of $\alpha$ and $\mu$, namely $\eta$T, the process would be made easier due to the fact that the positive clutching order has to be sent shortly before the synchronization is obtained.

SUMMARY OF THE INVENTION

The present invention achieves these improvements and allows for a continuous contact of the positive clutches before synchronization, but with an adequately low differential speed, in order that the effort causing this contact is not limited, which could cause a deterioration of the positive clutches.

Such a solution offers the advantage of being able to shift gears "on the move", namely within a very short time, and practically without the slipping of the clutch which, therefore, becomes more durable.

A device according to the present invention allows for the performance of the above described operations, using a simple construction and without any of the disavantages encountered by using traditional members. Actually various attempts have been made using reciprocating hydraulic cylinders to move the sliding plates and forks controlling the gearbox sliding gears. Experience shows that, regardless of the displacement obtained, the clearance volume of a reciprocating cylinder equals the operating volume of the stroke. Furthermore, as one of the two chambers of a reciprocating cylinder is filled, the other is emptied, which causes a dynamic resistance to the piston strokes. For these various reasons, it has been determined that the reciprocating cylinder represents a solution which is incompatible with a quick action.

The present invention eliminates these disadvantages.

A device according to the invention and designed to actuate the positive clutches of gearbox sliding gears following synchronization of the respective pairs of gears includes at least a cylinder mechanism on each sliding plate of the gearbox, as well as solenoid valves which are controlled by an electronic calculator to select and activate the cylinders in one or the other direction. This device is further characterized by the fact that each cylinder mechanism includes two oppositely acting pistons, each connected to the sliding plate, and each sliding in its own cylinder which also includes a return spring which operates against each piston and which practically eliminates the clearance above the piston as the latter is about to be activated.

According to another feature of the invention, each piston is pushed back against the fixed bottom of its cylinder, by means of a return spring, while both piston rods are arranged parallel to one another and interconnected by the opposite ends of a lever whose central portion is directly connected with the gearbox control fork.

According to another embodiment of the invention, the opposite pistons are rigidly mounted to the ends of the same sliding plate, each piston sliding in the same sealed chamber as a passive counter-piston which is pushed and kept at a stop by a counter-pressure before activation of the respective piston, so as to eliminate the piston clearance.

For a further understanding of the present invention and the objects thereof, attention is directed to the drawing and the following description thereof, to the detailed description of the preferred embodiment, and to the appended claims.

DETAILED DESCRIPTION OF THE PREFERRED EMBODIMENT

Figure 1:
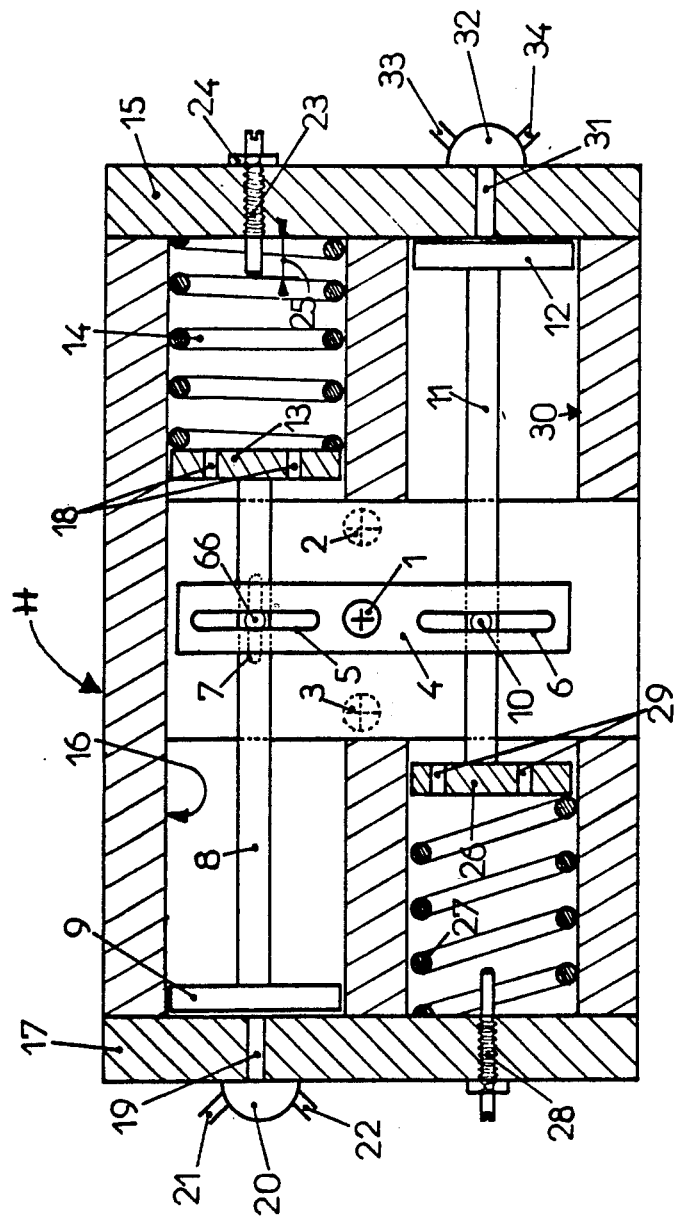
FIG. 1 is a schematic view illustrating a preferred embodiment of the invention.

FIG. 1 illustrates a fork 1 that controls the positive clutch of a gearbox, in a conventional manner. The gearshift operation consists of shifting the fork 1 from its neutral position, as illustrated, to either position 2, where it clutches a gear, or position 3, where it clutches the gear of another ratio.

The fork 1 is rigidly attached to a lever 4 at the central portion of the lever 4. The respective ends of the lever 4 include elongated openings 5 and 6 that extend longitudinally of the lever 4.

A pin 66 extends through the elongated opening 5 and through a longitudinally extending opening 7 and is mounted in a rod 8 to which a first sliding piston 9 is attached. The elongated openings 5 and 6 are in alignment with one another when the assembly is in the reset position, as illustrated.

At its other end, the lever 4 is connected by a pin 10, that extends through the elongated opening 6, to a rod 11 of a second sliding piston 12, that acts oppositely to the first piston 9.

The first sliding piston 9 and its rod 8 are mounted opposite to the second sliding piston 12 and its rod 11; in other words, the rod 8 and first sliding piston 9 are symmetrical with the rod 11 and the second sliding piston 12 with reference to the center represented by the fork 1 when the assembly is in the rest position.

Opposite to the first sliding piston 9, the rod 8 is rigidly mounted to a push plate 13 which is supported by a helical compression spring 14 resting against a fixed transverse wall 15 of a housing H.

The assembly of the first sliding piston 9 and the push plate 13 slides inside a first cylinder 16 in the housing H, the first cylinder 16 being closed behind the spring 14 by the wall 15 and, in front of the first sliding piston 9, by a second wall 17 of the housing H that is similar to the wall 15. The first sliding piston 9 slides with minimal clearance inside the cylinder 16. A number of vents 18, however, have been provided through the push plate 13, in order to avoid any air compression around the spring 14.

Facing the first sliding piston 9, the second wall 17 includes an inlet hole 19 which may be connected whenever desirable by a solenoid valve 20, with a compressed air feed line 21, or with a line 22 opening directly to the outside atmosphere.

In the center of the helical spring 14, the wall 15 includes a stop screw 23 equipped with a locknut 24. This arrangement allows for the setting of a length 25 by which the stop screw 23 extends inside the housing H where it may be used as a stop for the push plate 13 when the latter has entirely compressed the spring 14.

The second sliding piston 12 and its rod 11 are symmetrically equipped, namely the opposite end of the rod 11 includes a push plate 26 compressing a helical compression spring 27, in front of an adjustable stop screw 28. Vents 29 are provided through the push plate 26 to avoid any air compression around the spring 27. The second sliding piston 12 slides with minimal clearance inside a second cylinder 30 which is connected by a line 31 with a solenoid valve 32. The solenoid valve 32 may be connected, alternatively, either with a compressed air feed line 33, or with a line 34 opening to the outside atmosphere.

The operation of the embodiment of FIG. 1 is as follows:

The position illustrated in FIG. 1 is the neutral or reset position in which the first and second sliding pistons 9 and 12, respectively, are kept against the bottoms of the first and second cylinders 16 and 30, respectively, by the springs 14 and 27. When the fork 1 is in the illustrated position, the gearbox is in neutral.

The neutral position may be adjusted by moving the pin 66.

The fork 1 is brought to the position 2 when the solenoid valve 20 applies pressure to the first sliding piston 9, which then compresses the spring 14 until it comes to a stop against the stop screw 23 which limits its stroke.

The position 3 of the fork 1 is obtained as pressure is applied by the solenoid valve 32 to the second sliding piston 12, whose stroke is limited by the stop screw 28.

Because of the presence of the elongated openings 5 and 6, intersected by the pivot pins 66 and 10, respectively, the three positions 1, 2, and 3 of the fork 1 may be arranged along a straight line, a semi-circle or in any other configuration.

When either of the solenoid valves 20 and 32 is connected with the exhaust or lines 22 or 34, as the case may be, the springs 14 and 27 reset the mechanism to the neutral position.

If, from the neutral position illustrated in FIG. 1, the solenoid valve 20 applies pressure to the first sliding piston 9, the latter immediately reacts since the clearance on top thereof is virtually nil. Thereupon, it compresses the spring 14 which comes to a stop against the stop screw 23. The pin 66 then displaces the respective end of the lever 4, which causes the fork 1 to move toward the position 2.

Two possibilities are then offered: either no resistance is felt by the fork 1, and the lever 4 pivots around the pivot pin 10 which remains fixed, thereby bringing the fork to position 2; or the fork 1 encounters a significant resistance, in which case the pivot pin 10 pushes the push plate 26 against the spring 27 which is then compressed. The subsequent reaction of the spring 27 tends to move the fork 1 to position 2. This effort of the spring 27, which is independent from the feed pressure measured in the feed line 21, provides the contact between the teeth of the positive clutches during the short pre-synchronization period.

The following observations can be made.

In order to compress the spring 27, the second sliding piston 12 should be displaced backward, thus, taking in fluid through the solenoid valve 32 which is then in an exhaust position. Dynamically speaking, the effort applied to the fork 1 will be that resulting from the push of the spring 27, increased by the dynamic effect of the second sliding piston 12.

The setting of the neutral position of the fork 1 on the gearbox sliding plate will be maintained, due to the approximation resulting from the play of the pivot pins 66 and 10 and of the other linkage. However, the effort required to cancel this setting will be smaller than the preload of the springs 14 and 27, which depend on the contact pressure desired for the teeth of the positive clutches.

Figure 2:
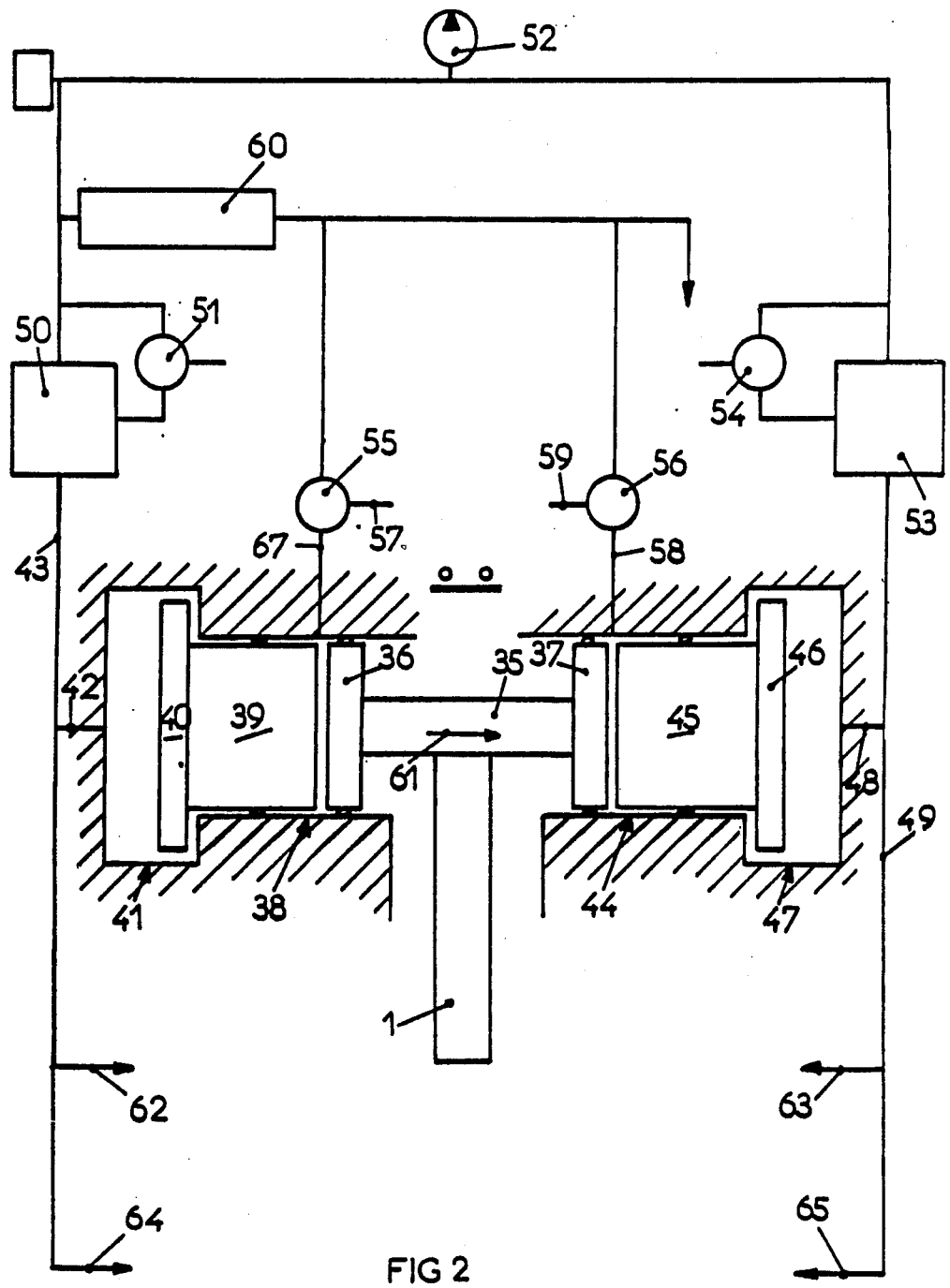
FIG. 2 is a schematic view of an alternative embodiment of the invention.

The embodiment illustrated in FIG. 2 is a compromise which offers a simpler construction. In the embodiment of FIG. 2, a sliding plate 35 of a fork $1^1$ has pistons 36 and 37, respectively attached at its opposite ends. These pistons, respectively, correspond to the first and second sliding pistons 9 and 12 of the FIG. 1 embodiment.

The piston 36 tightly moves with minimal clearance in a bore 38, and faces a sliding counterpiston 39, which also moves with minimal clearance in the bore 38 and the an enlarged head 40. The head 40 is slidable within a bore 41 that is connected by a line 42 to a pressure feed line 43.

Opposite to the piston 36, the piston 37 moves with minimum clearance in a bore 44, and faces a sliding counterpiston 45 which also moves with minimum clearance in a bore 47 and has an enlarged head 46. The bore 47 is connected by a line 48 to a pressurized feed line 49.

A large discharge neutral position solenoid valve 50, controlled by a solenoid valve 51, allows for selective connection of the feed line 43 to a compressed air source 52. Likewise, a large discharge solenoid valve 53, controlled by a solenoid valve 54, allows for the connection of the pressurized feed line 49 to the compressed air source 52.

Solenoid valves 55 and 56 are provided and are connected in parallel to the compressed air source 52. In the illustrated embodiment, the solenoid valve 55, which illustratively controls the reverse gear, allows for the sending of pressure to a line 67 that opens into the bore 38, at a location between the pistons 36 and the counterpiston 39 or, alternatively, for the connection of the line 67 to an exhaust line 57, that opens to the outside atmosphere.

Likewise, the solenoid valve 56 allows for the connection of a line 58 between the virtually nil clearance between the piston 37 and the counterpiston 45 with either the compressed air source 52, or with an atmosphere discharge line 59.

The operation is as follows.

Any gearshift operation begins with the setting in neutral of the gearbox. The time required for this operation is not critical since the chain of operations will not start before that position has been reached.

Upon activation of the solenoid valves 51 and 54 monitoring the large discharge solenoid valves 50 and 53, the neutral chambers are being filled and push back the counterpistons 39 and 45 until their enlarged heads 40 and 46 come to a stop as illustrated in FIG. 2. This provides a quick filling and, under the system's maximum pressure, keeps at a stop one or both counterpistons 39 and 45 which will be opposite to the travel direction selected in the subsequent phases.

As the neutral position has been reached, the switching element of a sensor switch, not illustrated herein, changes position, and by this change the electronic calculator operates to drain the chambers connected to the lines 43 and 49. For instance, all chambers such as that of the head 46, representing the line 49 controlled by the solenoid valve 54 can be drained. These chambers will be completely drained as soon as the synchronization has been obtained, due to the fact that the opposite solenoid valve, 55 for instance, starts opening as the synchronization begins.

Shortly before reaching synchronization, the solenoid valve 55, selected to engage the desired gear ratio, is opened to feed a pressure regulated by a regulating valve 60 to the virtually nil clearance chamber located between the piston 36 and its counterpiston 39. The engaging pressure defined by the regulating valve 60 is smaller than the neutral position pressure measured in the lines 43 and 49. This prevailing pressure maintains the head 40 of the counterpiston 39 in a stop position as illustrated in FIG. 2, so that as the line 67 is fed with the pressure regulated by the valve 60, the assembly encompassing the sliding plate 35 and the fork $1^1$ is driven to the right, as indicated by arrow 61. The pressure build-up in the chamber defined between the piston 36 and its counterpiston 39 is very quick, due to the fact that the piston clearance is virtually nil. As a result, the effort required to overcome the setting of the neutral position ball of the gearbox is reached very quickly. This allows for a quick start of the engaging motion and the contact pressure of the positive clutch teeth is defined by the engaging pressure regulated by the valve 60. Upon synchronization, the positive gears mesh.

The electronic calculator then senses that the gear ratio, between the gearbox input and output, matches the selected ratio. This means that the gear shifting has been accomplished. The calculator then breaks the activation of the solenoid valves 50 and 53 and none of the gearbox valves is activated any longer; the gearshft cycle is then over.

It is clear that the line 42 and 48 represent one track for shifting the gearbox. The other tracks may be defined between line 43 and 49, for instance by line 62 and 63, for the first and second gear ratios, and by lines 64 and 65, for the third and fourth gear ratios.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. A gearbox apparatus comprising:
   housing means defining a chamber and first and second cylindrical passages within said chamber, said first cylindrical passage being spaced apart from said second cylindrical passage in a direction that extends normally to said first cylindrical passage, each of said first and second cylindrical passages having a first end and a second end, at least one of said first end and said second end of each of said first cylindrical passage and said second cylindrical passage being substantially closed;
   first piston rod means being reciprocable within one of said first and second cylindrical passages along a first path between a first first path extreme position and a second first path extreme position, said first path extending longitudinally of said first piston rod means;
   first and second pistons, each of said first and second pistons being secured to said first piston rod means and being reciprocable therewith, said first and second pistons being spaced apart along said first piston rod means, one of said first and second pistons being positioned, relative to said at least one of said first end and said second end of said first and second cylindrical passages, to define nil cylindrical clearance therewith when said first piston rod means is in one of said first first path extreme position and said second first path extreme position;
   second piston rod means being reciprocable within the other of said first and second cylindrical passages along a second path between a first second path extreme position and a second second path extreme position, said second path extending longitudinally of said second piston rod means;

third and fourth pistons, each of said third and fourth pistons being secured to said second piston rod means and being reciprocable therewith, said third and fourth pistons being spaced apart along said second piston rod means, one of said third and fourth pistons being positioned, relative to said at least one of said first end and said second end of said other of said first and second cylindrical passages, to define nil cylindrical clearance therewith when said second piston rod means is in one of said first second path extreme position and said second second path extreme position;

actuating means for actuating the reciprocation of said first piston rod means and said second piston rod means, to reciprocate said first piston rod means along said first path between said first first path extreme position and said second first path extreme position and to reciprocate said second piston rod means along said second path between said first second path extreme position and said second second path extreme position, said actuating means further comprising fluid pressure means for applying fluid pressure to a first space between said at least one of said first and second end of said one of said first and second cylindrical passages and said one of said first and second pistons to urge said first piston rod means towards said second first path extreme position, said fluid pressure means further applying fluid pressure to a second space between said at least one of said first and second end of the other of said first and second cylindrical passages and said one of said third and fourth pistons to urge said second piston rod means toward said second second path extreme position;

first resilient return means acting on said first piston rod means and tending to urge said first piston rod means along said first path toward said one of said first first path extreme position and said second first path extreme position; and second resilient return means acting on said second piston rod means and tending to urge said second piston rod means along said second path toward said one of said first second path extreme position and said second second path extreme position.

2. A gearbox apparatus according to claim 1 wherein said actuating means further comprises:
   a lever pivotally connected to said first piston rod means and to said second piston rod means; and
   a control fork attached to said lever for moving said lever to cause said lever to actuate the reciprocation of said first piston rod means and said second piston rod means.

3. A gearbox apparatus according to claim 1 wherein said second path extends generally parallel to said first path.

4. A gearbox apparatus according to claim 1 wherein said actuating means further comprises first exhaust passage means for exhausting fluid pressure from said first space and second exhaust passage means for exhausting fluid pressure from said second space.

5. A gearbox apparatus according to claim 4 wherein said first exhaust passage means is open to the atmosphere and wherein said second exhaust passage means is open to the atmosphere.

6. A gearbox apparatus according to claim 4 wherein said actuating means further comprises solenoid valve means cooperative with said fluid pressure means and said first exhaust passage means and said second passage means for selectively controlling the operation of said fluid pressure means and said first exhaust passage means and said second exhaust passage means.

7. An apparatus for actuating the selector fork of a gearbox comprising:
   housing means defining a chamber, said chamber including a first cylindrical passage and a substantially parallel second cylindrical passage laterally displaced from said first cylindrical passage, said first cylindrical passage having one of its ends substantially closed and said second cylindrical passage having one of its ends substantially closed, said substantially closed end of said first cylindrical passage being opposite said substantially closed end of said second cylindrical passage;

first piston rod means, longitudinally disposed in said first cylindrical pasasge and reciprocable therein along a first path between a first extreme position and a second extreme position;

first and second pistons attached to opposing ends of said first piston rod means and reciprocable therewith, said first piston being positioned adjacent to said substantially closed end of said first cylindrical passage when said first piston rod means is at its first extreme position;

second piston rod means, longitudinally disposed in said second cylindrical passage and reciprocable therein along a second path between a first extreme position and a second extreme position;

third and fourth pistons attached to opposing ends of said second piston rod means and reciprocable therewith, said third piston being displaced to a position adjacent to said substantially closed end of said second cylindrical passage when said second piston rod means is at its first extreme position;

first resilient return means producing a force biasing said first piston rod means, said first piston and said second piston in a first direction away from said substantially closed end of said first cylindrical passage;

second resilient return means producing a force biasing said second piston rod means, said third piston and said fourth piston in a second direction, opposite said first direction away from said substantially closed end of said second cylindrical passage;

a lever connected to the selector fork of the gearbox, said lever pivotally connected at one end to said first piston rod means and pivotally connected at the other end to said second piston rod means, said lever positioning said selector fork in a neutral position when said first and second piston rod means are in their respective first extreme positions, said lever further positioning said selector fork in a first gear engagement position when said first piston rod means is displaced to its second extreme position and positioning said selector fork in a second gear engagement position when said second piston rod means is displaced to its second extreme position;

first electrically controlled valve means having a first state venting the volume in said first cylindrical passage between said second piston and said housing means when said first piston rod means is at said second extreme position and switchable to a second state applying a fluid under pressure to the volume in said first cylindrical passage between said second piston and said housing when said first piston rod means is at said first extreme position, said fluid under pressure operative to displace said first piston and said first piston rod means towards said first extreme position of said first piston rod means; and a second electrically controlled valve having a first state venting the volume in said second cylindrical passage between said third piston and said housing means when said second piston rod means is at said second extreme position and switchable to a second state applying fluid under pressure to the volume in said second cylindrical passage between said third piston and said housing means when said second piston rod means is at said first extreme position, said fluid under pressure operative to displace said third piston and said second piston rod means towards said first extreme position of said second piston rod means.

8. An apparatus according to claim 7 wherein said first electrically controlled valve means vents the volume of said first cylindrical passage between said second piston and said housing means when said first piston rod means is at said second extreme position to the atmosphere and said second electrically controlled valve means vents the volume of said second cylindrical passage between said third piston and said housing means when said second piston rod means is at said second extreme position to the atmosphere.

9. An apparatus according to claim 7 wherein said first and second electrically controlled valve means are solenoid valves.

10. An apparatus according to claim 1 wherein the selector fork of the gearbox is attached to said lever intermediate said one end and said other end.

11. An apparatus according to claim 7 wherein said first and second gear engagement positions of the selector fork are on opposite sides of said neutral position.

12. An apparatus according to claim 7 having means for adjusting the location where said lever is pivotally connected to at least one of said first and second piston rod means for adjusting the location of said neutral position of said selector fork.

13. An apparatus according to claim 7 wherein said first resilient return means comprises a first spring acting on said second piston and wherein said second resilient return means further comprises a second spring acting on said fourth piston, and further comprising:

first adjustable stop screw means adapted to be contacted by said second piston to adjustably limit the reciprocation of said first piston rod means toward said second extreme position; and second adjustable stop screw means adapted to be contacted by said fourth piston to adjustably limit the reciprocation of said second piston rod means toward said second extreme position.

* * * * *

UNITED STATES PATENT AND TRADEMARK OFFICE
CERTIFICATE OF CORRECTION

PATENT NO. : 4,846,050
DATED : July 11, 1989
INVENTOR(S) : Sibeud et al

It is certified that error appears in the above-identified patent and that said Letters Patent is hereby corrected as shown below:

On the title page, item [54], and in column 1, lines 1-4, the title should read --SYNCHRONIZED CONTROL OF A GEARBOX BY AN ELECTRONIC CALCULATOR--.

Column 3, line 40, delete "cylider" and insert ---- cylinder ----.

Column 5, line 4, delete "the" and insert ---- has ----.

In the Claims

Column 10, line 4, delete "1" and insert ---- 7 ----.

Signed and Sealed this

Eleventh Day of August, 1992

Attest:

DOUGLAS B. COMER

*Attesting Officer*     Acting Commissioner of Patents and Trademarks